United States Patent [19]

Baird et al.

[11] Patent Number: 5,470,472

[45] Date of Patent: Nov. 28, 1995

[54] ROTARY DRUM FILTER WITH RECIPROCATING NOZZLE MEANS

[75] Inventors: David P. Baird, Cumming; Richard L. Reiter, Alpharetta, both of Ga.

[73] Assignee: Dorr-Oliver Incorporated, Milford, Conn.

[21] Appl. No.: 243,170

[22] Filed: May 16, 1994

[51] Int. Cl.$^6$ ................................................. B01D 33/06
[52] U.S. Cl. ........................ 210/391; 210/396; 210/402; 210/406; 210/408; 210/409
[58] Field of Search ................................. 210/193, 217, 210/391, 412, 396, 402, 403, 404, 406, 408, 409

[56] References Cited

U.S. PATENT DOCUMENTS

| | | | |
|---|---|---|---|
| 2,403,021 | 7/1946 | Peterson et al. | 210/201 |
| 2,839,194 | 6/1958 | Lopker et al. | |
| 3,075,646 | 1/1963 | Giesse | 210/391 |
| 3,145,164 | 8/1964 | Jonkman | 209/254 |
| 3,169,706 | 2/1965 | Ross | 239/186 |
| 3,521,751 | 7/1970 | Holthuis | |
| 3,688,337 | 9/1972 | Noda | 15/256.53 |
| 3,877,366 | 4/1975 | Holthuis | 210/219 |
| 4,024,062 | 5/1977 | Richards et al. | 210/406 |
| 4,303,524 | 12/1981 | Richards et al. | 210/406 |
| 4,540,469 | 9/1985 | Lundstrom | 162/199 |
| 4,547,295 | 10/1985 | Carr, Jr. et al. | 210/777 |
| 4,725,292 | 2/1988 | Williams | 55/96 |
| 4,795,558 | 1/1989 | LaValley | 210/217 |
| 4,836,917 | 6/1989 | Tomita et al. | 210/104 |
| 4,952,325 | 8/1990 | Clifford | 210/741 |
| 4,995,991 | 2/1991 | Ljokkoi et al. | 210/797 |
| 5,143,555 | 9/1992 | Brady | 134/42 |
| 5,149,448 | 9/1992 | Mattelmaki | 210/784 |

*Primary Examiner*—Robert A. Dawson
*Assistant Examiner*—Robert James Popovics
*Attorney, Agent, or Firm*—DeLio & Peterson

[57] ABSTRACT

A rotating drum filter assembly for thickening lime sludge includes a liquid jet distributor for directing liquid jets against a strip of lime sludge filter cake on the ascending side of the drum. The distributor is positioned on the ascending side of the drum and within 45° of a vertical plane tangential to the drum peripheral surface. The liquid jets are directed so as to disperse the strip in a manner such that substantially all of the lime sludge comprising the strip remains on the drum. Cake wash water formed by water distributed from shower heads immediately refills the cleaned strip thereby minimizing loss of vacuum within the hollow drum interior.

10 Claims, 5 Drawing Sheets

ROTARY DRUM FILTER WITH RECIPROCATING NOZZLE MEANS

BACKGROUND OF THE INVENTION

1. Field of the Invention

The present invention relates to an improved rotary drum filter.

2. Problem to be Solved

Rotary drum filters have been utilized for dewatering slurries for chemical, food, minerals beneficiation, pulp and paper, pharmaceutical and other industrial plants. They have also been used in waste water treatment plants to dewater industrial and municipal sludges, and to thicken lime sludge.

The filtration area on the drum surface is typically divided into independent cells connected by pipes to a vacuum system. The drum deck is formed by replaceable filter grits which support the filter medium. The filter medium is typically a cloth fabricated from fabric or metal. A vacuum pump provides the forces necessary to accomplish dewatering. The vacuum in effect sucks the slurry liquor through the filter medium. The solids in the feed slurry contained in the filter vat form a cake on the filter cloth. Feed slurry is introduced continuously into the filter vat and an adjustable overflow controls the liquid level. The vat is equipped with an agitator to keep the solids from thickening up and settling, processes which will interfere with the efficient operation of the filter. Discharge of the cake takes place on the descending side of the drum.

When used for thickening lime sludge, the filter drum is partly immersed in a vat containing lime sludge. At the beginning of the filtering process, a precoat filter layer of lime sludge is formed on the surface of the filter drum. A scraper is used for scraping off the dried lime sludge from the surface of the precoat. The dried lime sludge falls onto a conveyer and further on to a feed screw which introduces the dried lime sludge into a lime sludge reburning kiln. After the scraper scrapes off the dried lime sludge, the whole precoat is removed and a new precoat formed. Typically, the precoat is removed by directing high pressure liquid jets against the precoat under the scraper. The liquid jets are oriented in a manner such that the liquid jets break the precoat and drop it into the vat, and clean the filter cloth. Typically, the liquid jets emanate from nozzles that are continuously reciprocated in a dimension parallel to the axis of rotation of the drum.

However, the process of removing the precoat from the drum filter in the manner described above requires an inordinate quantity of water which degrades the efficiency of conventional rotary drum filters and increases operating costs of such systems. It has been found that such inordinate amounts of water are required to remove the precoat because the filter cake on the descending side of the drum filter is thinner, since most of the liquid has been extracted by the vacuum within the drum, and the filter cake on the portion of the descending side of the drum is compacted due to contact with the underside of the scraper. Furthermore, the precoat layer on descending side of the filter drum has a solids content of about 65% to about 78%. It has been found that these factors make it difficult to remove the precoat from the descending side of the drum which is under the scraper.

It is also been found that conventional devices for reciprocating the nozzles in a dimension parallel to the rotational axis of the drum are typically bulky and inefficient due to the fact that, in addition to the nozzles, associated components such as electronic circuitry, wiring, hoses, etc. must travel the full length of the drum thereby causing extreme wear of the components which produce the reciprocating motion. Typically, these components which produce the reciprocating motion include a chain and sprocket drive mechanism. Such wear causes frequent breakdowns of the reciprocating device. Furthermore, it has been found that the hoses frequently become entangled with other components associated with the drum filter while the hoses are traveling along the longitudinal length of drum.

Another problem with conventional rotary drum filters is the loss of vacuum resulting when the precoat is removed from the drum and the filter cloth is exposed. Conventional filters provide shut off valves which deactivate the vacuum in the cell of the drum corresponding to the exposed filter cloth. Furthermore, since the drum is continuously rotating, the interior cell corresponding to the exposed filter cloth must have the vacuum within that cell deactivated once the filter cake is removed, and then activated once new lime sludge covers the surface of the drum corresponding to the cell in question. However, the addition of these shut off valves adds to the operational complexity of the rotary drum filter and increases manufacturing costs of such systems.

Bearing in mind the problems and deficiencies of conventional rotary drum filters, it is an object of the present invention to provide a new and improved rotary drum filter that utilizes less water in the operation thereof.

It is another object of the present invention to provide a new and improved rotary drum filter in which the pressure of the liquid jets directed toward the drum filter surface is less than that in conventional rotary drum filters.

It is a further object of the present invention to provide a new and improved rotary drum filter wherein the vacuum within the drum interior may be constantly maintained in all portions or cells of the drum interior.

It is yet another object of the present invention to provide a reciprocating mechanism for reciprocating nozzles in a dimension parallel to the drum rotational axis that is lightweight, structurally stable and inexpensive to manufacture.

A characteristic feature of the present invention is that liquid jets are directed against the precoat and outer layers located on the ascending side of the drum filter.

Another characteristic feature of the present invention is that a strip of precoat and outer layer is dispersed on the ascending side of the drum and then immediately refilled with lime cake wash water so as to minimize vacuum loss within the corresponding interior cell of the drum.

Another characteristic feature of the apparatus of the present invention is that a reciprocating mechanism is provided that reciprocates a pair of nozzles in a dimension substantially parallel to the drum rotational axis wherein each nozzle travels half the longitudinal distance of the drum.

An advantage of the rotary drum filter of the present invention is that less water is utilized in the operation thereof.

Another advantage of the rotary drum filter of the present invention is that vacuum loss within the interior of the drum is minimized during the operation thereof.

A further advantage of the rotary drum filter of the present invention is that the pressure of liquid jets directed against the drum filter is significantly lower than in conventional rotary drum filters.

Another advantage of the present invention is that reciprocating mechanism utilized therein reciprocates a minimum number of components with the nozzles.

SUMMARY OF THE INVENTION

The above and other objects and advantages, which will be apparent to those skilled in the art, are achieved in the present invention which is directed to, in a first aspect, a rotary drum filter assembly for thickening lime sludge. The assembly is operatively associated with a vat containing lime sludge and comprises a filter drum having a peripheral filter surface and a hollow interior wherein the drum is mounted on a shaft for rotation about a substantially horizontal axis and a liquid jet distributor positioned on the ascending side of the drum at an angle within 45° of a vertical plane tangential to the peripheral surface. The angle is measured from the vertical plane in a direction opposite the direction of rotation of the drum. The distributor directs a liquid jet toward the drum peripheral surface. The assembly further comprises a scraper positioned on the descending side of the drum for scraping accumulated sludge from the peripheral filter surface, and a shower head positioned past the distributor in the direction of rotation of the drum. The shower head distributes liquid to the drum peripheral filter surface.

In a related aspect, the present invention is directed to a method of thickening lime sludge utilizing a filter drum having a peripheral filter surface at least partially immersed in a vat containing lime sludge and being mounted by a shaft for rotation about a substantially horizontal axis wherein the drum ascends on one side of the axis in a direction of rotation and descends on the other side of the axis in the direction of rotation, comprising the steps of continuously rotating the drum about its axis so that the drum filter surface comes in contact with lime sludge in the vat so that a precoat filter is formed on the drum filter surface, and an outer layer of lime sludge collects on the precoat layer, directing a liquid jet against a strip of the precoat and outer layers on the ascending side of the drum and above the lime sludge in the vat to disperse the precoat and outer layers so as to form a cleaned strip, the liquid jet being directed against the strip in a manner such that substantially all of the lime which comprises the strip of precoat and outer layers remains on the drum, thereafter applying liquid to the cleaned strip so that the liquid and the precoat and outer layers surrounding the strip form a cake wash liquid which fills in the strip to form a single layer of lime sludge, and scraping from the drum the dried outer layer which is located on the descending side of the drum.

BRIEF DESCRIPTION OF THE DRAWINGS

For a fuller understanding of the invention, reference should be made to the following description taken in connection with the accompanying drawings, in which.

DESCRIPTION OF THE PREFERRED EMBODIMENTS

Figure 1:
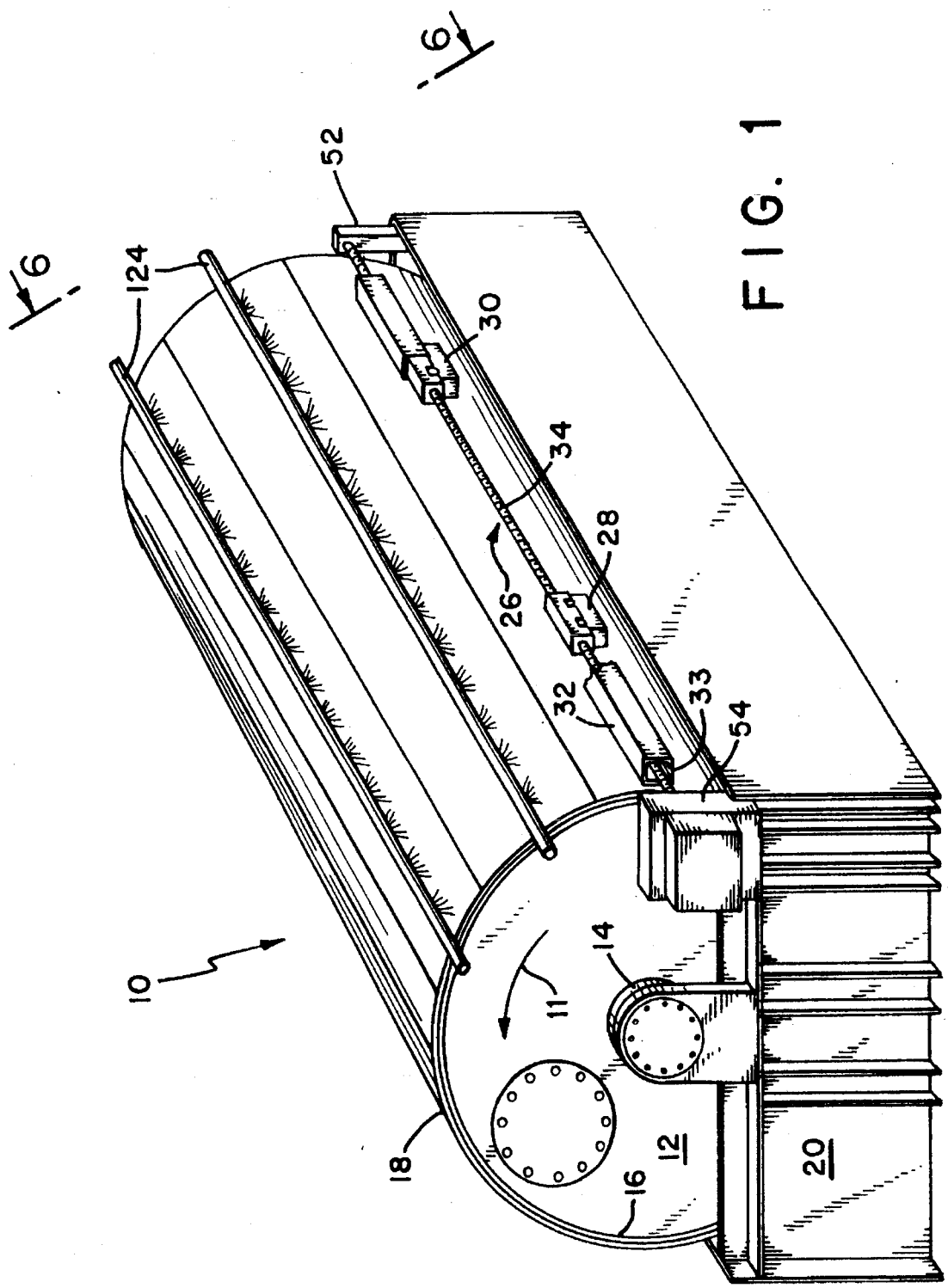
FIG. 1 is a perspective view of the rotary drum filter of the present invention.

In describing the preferred embodiment of the present invention, reference will be made herein to FIGS. 1–6 of the drawings in which like numerals refer to like features of the invention. Features of the invention are not necessarily shown to scale in the drawings.

Referring to FIG. 1, rotary drum filter 10 of the present invention comprises drum 12 which is mounted on shaft 14 for rotation about a substantially horizontal axis. Drum 12 ascends on one side of the horizontal axis in a rotational direction, indicated by arrow 11, and descends on the other side of the horizontal axis in the direction of rotation. Shaft 14 is rotated by a drive (not shown). The shell of drum 12 is composed of a perforated plate 16 covered with a filter cloth 18. Drum 12 is partially immersed in vat 20 containing lime sludge. Vat 20 is provided with an inlet (not shown) through which lime sludge is introduced into the vat with a dry-solids consistency content of about 20% to about 25%. The interior of drum 12 is hollow and is connected to a vacuum system (not shown) through one end of shaft 14, by a method well known in the art.

Figure 6:
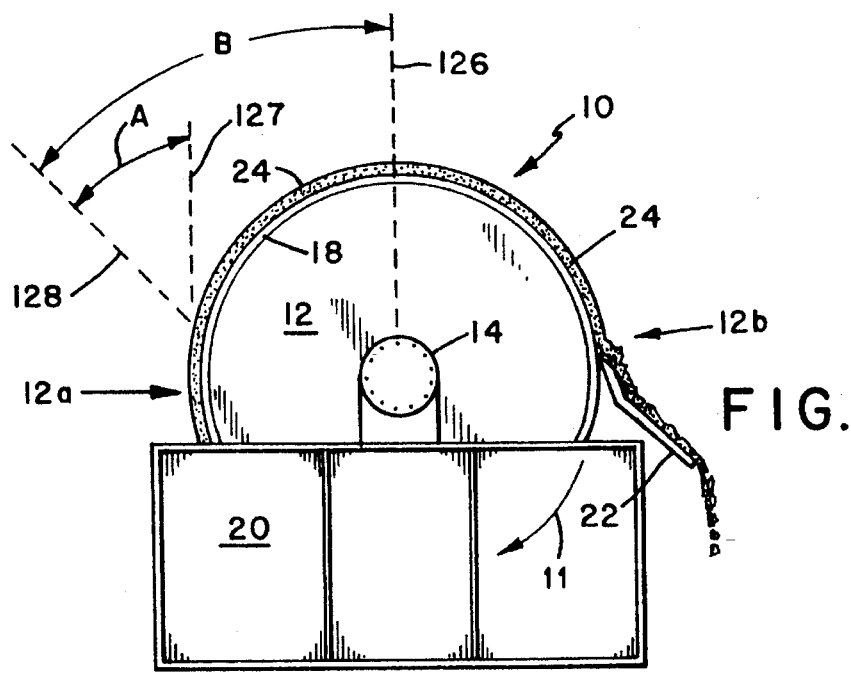
FIG. 6 is an end view taken along line 6—6 of FIG. 1.

Referring to FIG. 6, a stationary scraper 22 is provided adjacent to and on the descending side 12b of drum 12. Scraper 22 extends longitudinally from one end of drum 12 to the other for removing dried lime sludge 24 from the surface of drum filter cloth 18. The scraper guides lime sludge 24 onto an adjacent belt conveyer (not shown) which transports it to a lime sludge reburning kiln or other peripheral devices (not shown).

Figure 2:
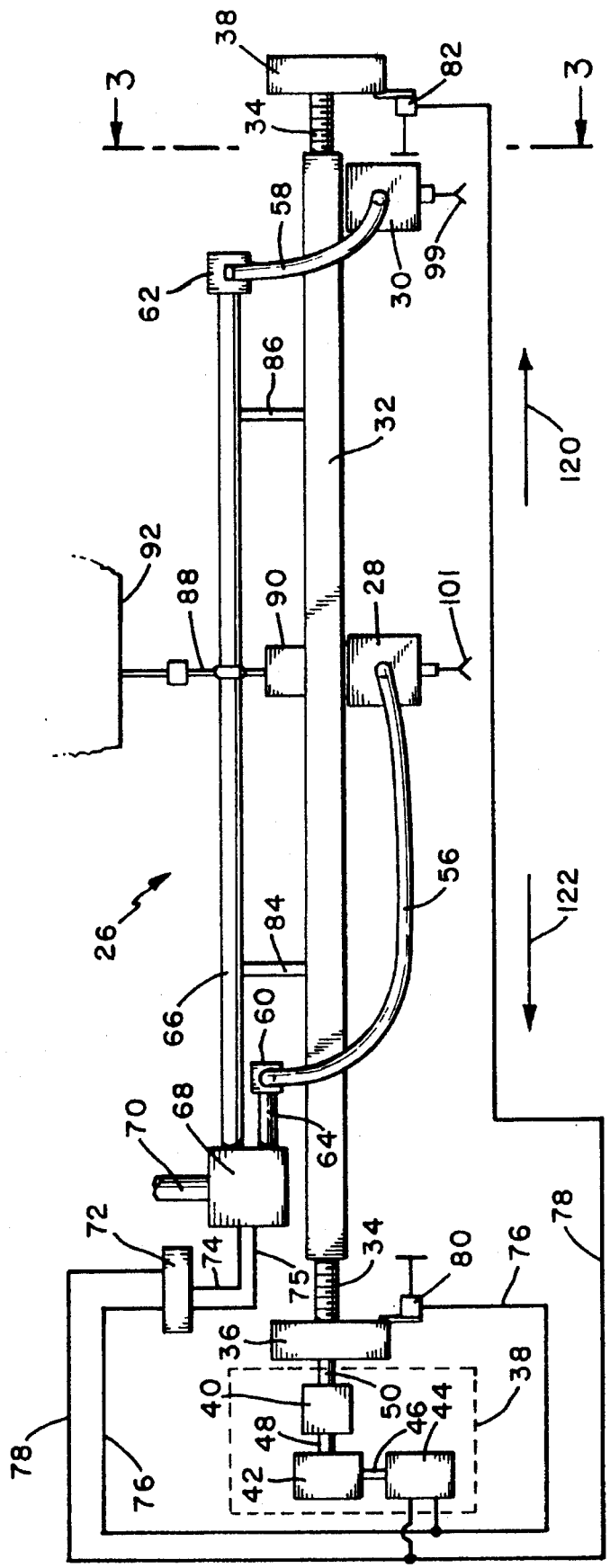
FIG. 2 is a side elevational view of the nozzle reciprocating mechanism utilized in the rotary drum filter of FIG. 1.

Referring to FIGS. 1 and 2, rotating drum filter 10 utilizes a reciprocating mechanism 26 for reciprocating liquid jet distributors or nozzles which direct liquid jets against filter cloth 18. Reciprocating mechanism 26 generally comprises nozzle carriages 28, 30, nozzle carriage support 32 and screw-type drive shaft 34. Nozzle carriage support 32 is substantially rectangular in shape (see FIG. 3). Each end of nozzle carriage support 32 is attached to a respective support frame member, i.e. member 52. Carriages 28, 30, carriage support 32, the support frames and drive shaft 34 are preferably fabricated from Nos. 304 or 316 grade stainless steel. Shaft 34 has an outer diameter of about two (2) inches and is supported by pillow block bearings 36, 38. Shaft 34 is driven by drive system 38 which comprises coupling 40, driver 42 and variable frequency drive motor 44. The use and operating principals of coupling 40 and driver 42 are well known in the art and therefore are not discussed herein. Motor 44 is reversible and thus, is able to reverse the direction of rotation of shaft 34. Drive link 46 connects motor 44 and driver 42. Drive link 48 connects driver 42 and coupling 40. Similarly, drive link 50 connects coupling 40 to pillow block bearing 36. In a preferred embodiment, motor 44 operates such that nozzle carriages 28, 30 travel at a velocity from about 1 inch per minute to about 2 inches per minute along shaft 34.

Referring to FIGS. 1 and 2, drive 34 extends along the entire longitudinal length of drum 12 and has each end thereof rotatably engaged with bearings 36, 38 which are mounted to respective support frame members, one of which being member 52. The other support frame member is not shown, however, it is adjacent housing 54. Housing 54 contains therein drive system 38 and shields drive system 38 from moisture, liquids, and lime sludge particles. Housing 54 is also fabricated from the aforementioned stainless steel.

Nozzle carriages 28 and 30 are fluidly and swivably connected to steel flexible hoses 56 and 58, respectively. Hoses 56 and 58 are fluidly and swivably connected to fittings 60 and 62, respectively. Fittings 60 and 62 are fluidly connected to fluid pipe 64 and 66, respectively. Pipes 64, 66 are fluidly connected to electrically activated dual-outlet valve 68 which receives fluid input at inlet 70. Valve 68 is controlled by the signals it receives from solenoid switch or relay 72 via cables 74, 75. Relay 72 receives two inputs 76, 78 that are produced by proximity or contact switches 80, 82, respectively. In a preferred embodiment, switches 80, 82, 72 and valve 68 are configured in a manner such that valve 68 will alternate the output of liquid between pipes 64 and 66. The distribution of liquid to either pipes 64, 66 depends on how valve 68 is activated by solenoid switch 72. Pipe 66 is supported by brackets 84 and 86 which are attached between pipe 66 and nozzle carriage support 32. Turnbuckle 88, which is attached to the hood 92 of the drum filter (the hood being partially shown in FIG. 2) supports pipe 66. Support bracket 90 is attached to the upper portion of carriage support 32 and connects carriage support 32 to pipe 66 and turnbuckle 88.

Figure 3:
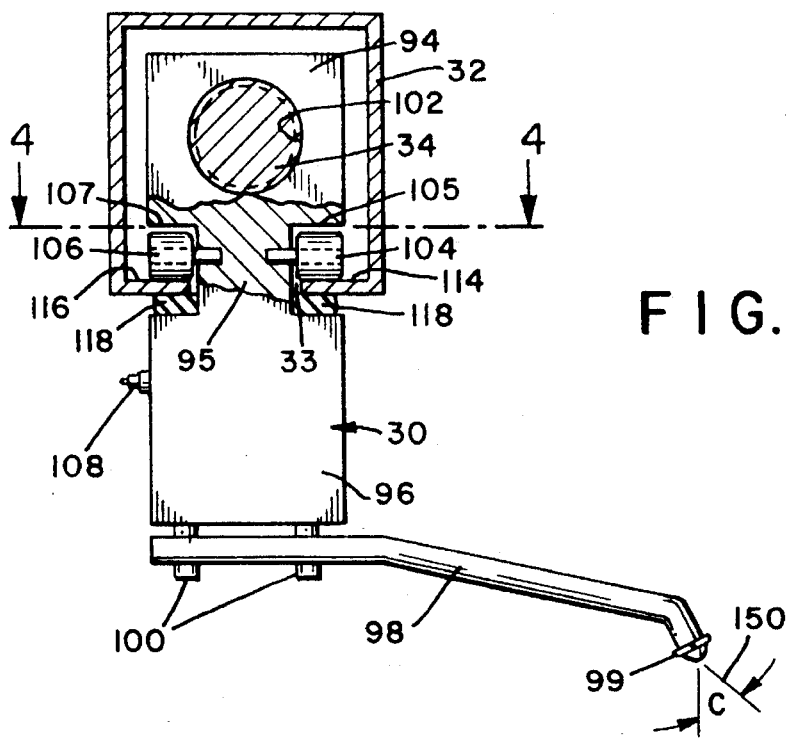
FIG. 3 is a end view taken along line 3—3 of FIG. 2.
Figure 4:
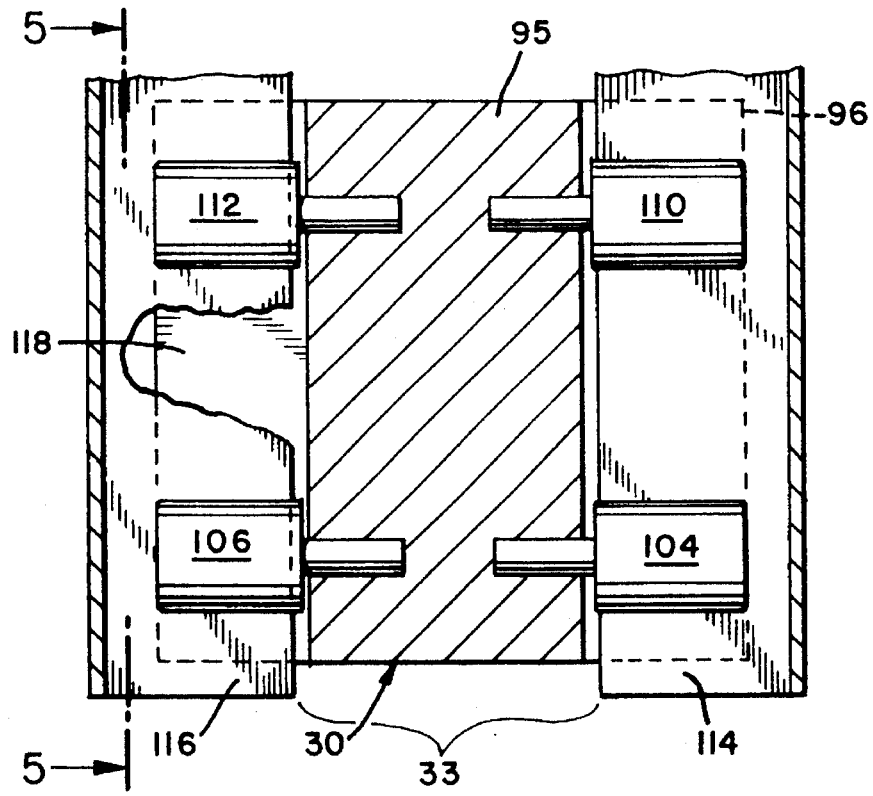
FIG. 4 is a view taken along line 4—4 of FIG. 3.
Figure 5:
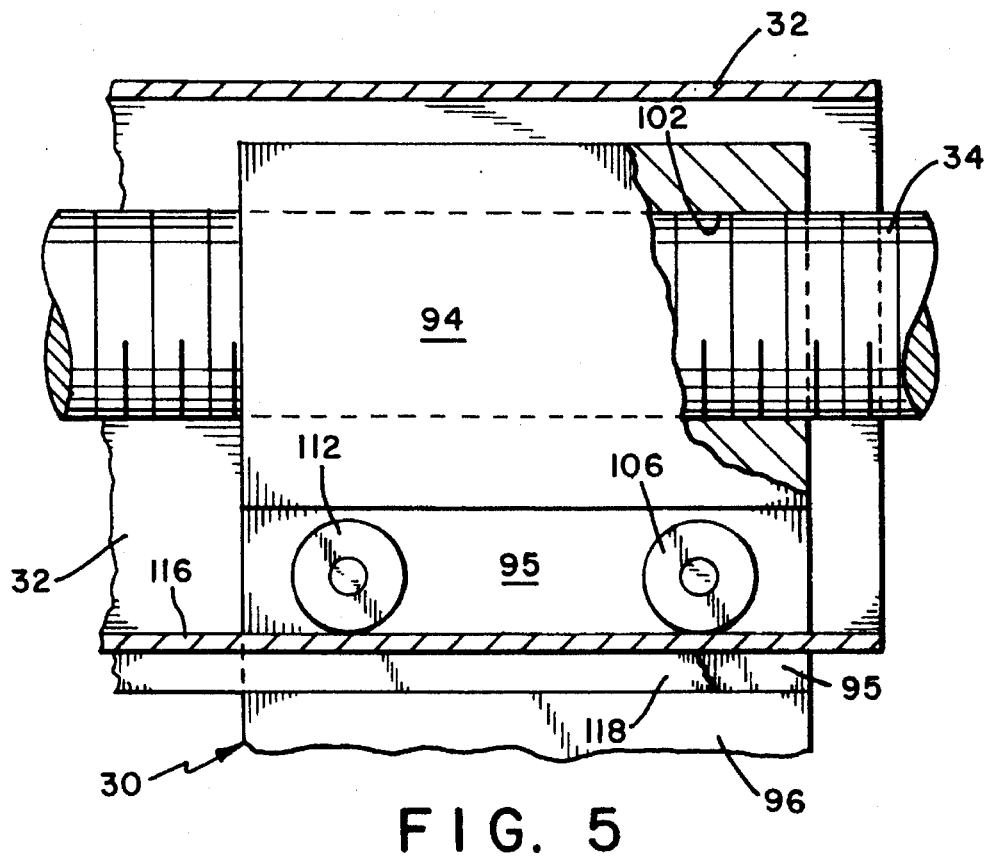
FIG. 5 is a side elevational view taken along line 5—5 of FIG. 4.

Referring to FIGS. 1 and 3–5, nozzle carriages 28 and 30 are rollably or slidably engaged with nozzle carriage support 32. Nozzle carriages 28 and 30 are identically constructed and are identically engaged with nozzle carriage support 32. However, only nozzle carriage 30 will be described below. As shown in FIG. 4, nozzle carriage 30 comprises upper portion 94, lower portion 96, conduit 98 and nozzle 99. Upper portion 94 is disposed within the interior of nozzle carriage support 32 and has threaded bore 102 which is threadedly engaged with drive shaft 34. Carriage 30 further includes a narrow portion, generally designated as 95, which is between upper and lower portions 94 and 96, respectively. Narrow portion 95 is configured so as to fit within channel 33 of nozzle carriage support 32 (see FIG. 1). Self-cleaning stainless steel rollers 104 and 106 are rotatably attached to narrow portion 95. Referring to FIG. 4, carriage 32 also includes stainless steel rollers 110 and 112 positioned at the end of nozzle carriage 32 which is opposite rollers 104, 106. Thus, rollers 104 and 110 are rollably engaged with surface 114 of carriage 32, and rollers 106 and 112 are rollably engaged with surface 116 of nozzle carriage support 32. In an alternate embodiment, surfaces 114, 116 can be wear-surfaces upon which surfaces 105, 107, respectively, can slide.

Conduit 98 is fixed to the bottom portion of lower portion 96 via clamps 100. Nozzle 99, which is fluidly connected to conduit 98, outputs a liquid jet which is directed toward the drum peripheral surface. Lubrication fitting 108 allows for the application of lubricating substances to lubricate shaft 34. Referring to FIG. 3, brush or lip seal 118 is attached to the bottom of nozzle carriage support 32. Seal 118 extends along the longitudinal length of carriage support 32 and has a slit therein which allows for the passage of narrow portion 95 of nozzle carriage 30. Seal 118 prevents lime sludge or liquids from contacting the track upon which rollers 104, 106, 110 and 112 travel. In a preferred embodiment, brush seal 118 has a thickness of about ⅜ inch.

Referring to FIG. 2, the distance separating nozzle carriages 28 and 30 is approximately equal to half the longitudinal length of drum 12. The direction in which nozzle carriages 28 and 30 travel is controlled by switches 80, 82. If carriages 28 and 30 are initially traveling in a direction indicated by arrow 120 and nozzle 99 is emitting a liquid jet, then the carriages 28, 30 will cease to travel in the direction indicated by arrow 120 and nozzle 99 will stop emitting liquid once nozzle carriage 30 contacts switch 82. When carriage 30 contacts switch 82, switch 82 sends signal 78 to motor 45 in order to reverse the rotational direction of drive link 46. Once the rotational direction of shaft 46 is reversed, screw drive shaft 34 begins to rotate in an opposite direction so as to cause nozzle carriages 28 and 30 to travel in the direction indicated by arrow 122. Signal 78 is also received by solenoid 72 which, in response, controls valve 68 to shift the distribution of fluid to pipe 64 so as to allow nozzle 101 to discharge a liquid jet toward the drum peripheral surface. Thus, as nozzle carriages 28 and 30 travel in the direction indicated by arrow 122, only nozzle 101 will be discharging liquids. When nozzle carriage 28 contacts proximity switch 80, switch 80 sends signal 76 to motor 45 and solenoid 72. In response, motor 45 reverses the rotational direction of link 46 so as to reverse the rotational direction of drive shaft 34. In response to signal 80, solenoid 72 controls valve 68 so as to shift the distribution of fluid to pipe 66. Thus, carriages 28 and 30 will now travel again in the direction indicated by arrow 120. While carriages 28 and 30 are traveling in this direction, only nozzle 99 will be discharging a liquid jet toward the drum peripheral surface. Switches 80, 82 and solenoid 72 can be configured as described above, to allow only one nozzle at a time to discharge fluid, or to allow discharge of fluids from nozzles 99 and 101 simultaneously. Simultaneous discharge of fluids from both nozzles may be necessary for some applications that require extra cleaning of filter cloth 18.

Drum 12 is rotated about its axis so that the drum peripheral surface having filter cloth 18 thereon contacts the lime sludge in vat 20 so that a precoat filter layer is formed on filter cloth 18, and a second layer of lime sludge collects on the precoat layer. The second layer of lime sludge located on the ascending side of the drum has a liquid content therein from about 60% to about 70%. A partial vacuum in drum 12 provides a pressure difference which extracts liquid from the lime sludge through filter cloth 18. As the drum 12 is rotated up from the lime sludge in vat 20, the partial vacuum effects liquid extraction from the lime sludge layer so as to increase the dry-solids content of the lime sludge. The liquid separated from the lime sludge is removed via a shaft or outlet (not shown) fluidly connected to drum 12 via the vacuum.

Figure 6A:
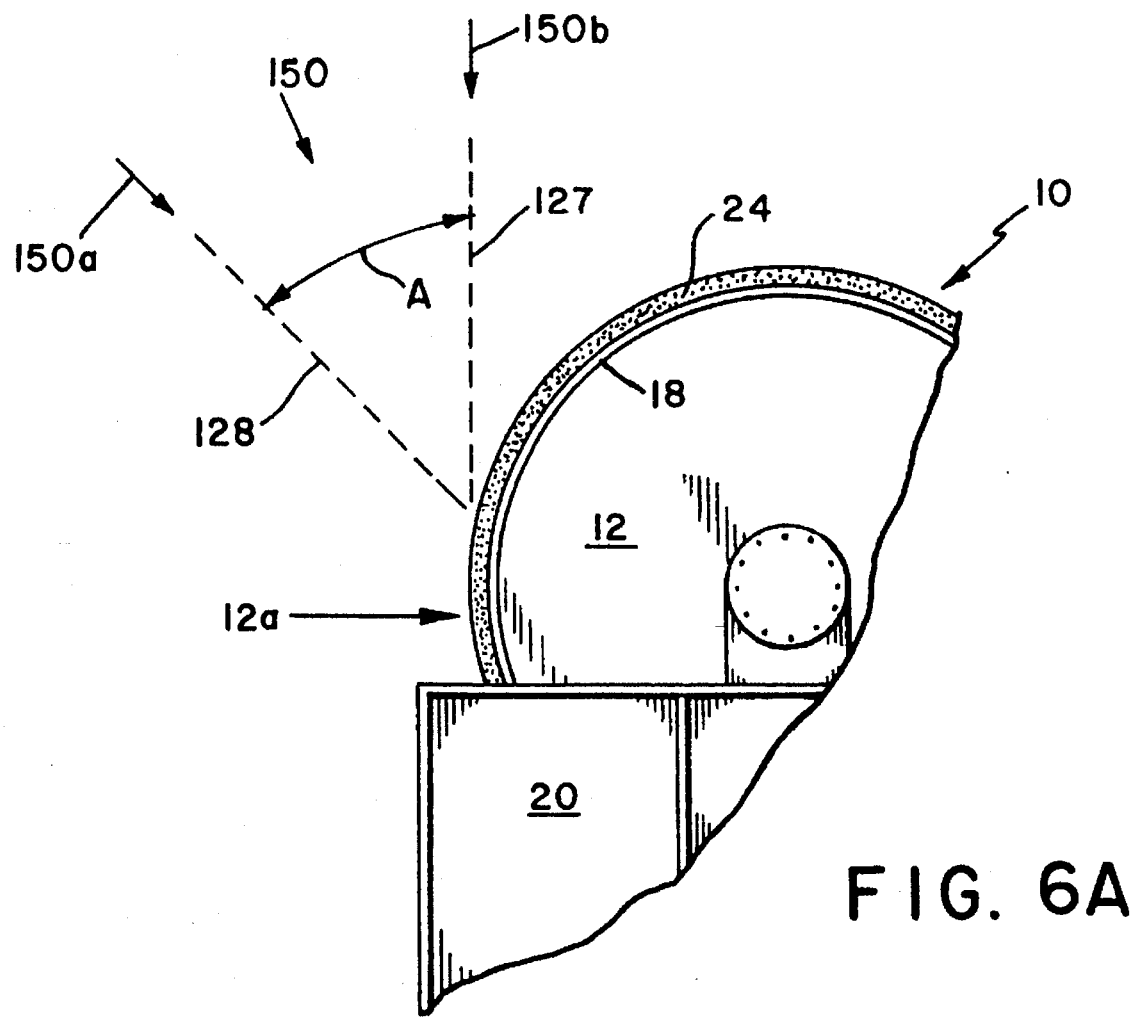
FIG. 6A is a partial, enlarged view of FIG. 6 showing the range in which liquid jets may be applied.

Reciprocating mechanism 26 is positioned on the ascending side of drum 12 and oriented in a manner such that the liquid jets 150 are directed against a strip of precoat 18 and second or outer layer 24 so as to disperse a strip of precoat and second layer in a manner such that substantially all of the lime sludge which comprises the strip of precoat and second layers remains on the drum. Referring to FIGS. 6 and 6A, reciprocating mechanism 26 is oriented in a manner such that the liquid jets emanating from nozzles 99, 101 contact the precoat and second layers on the ascending side 12a of drum 12 and within 45 degrees of a vertical plane 127, which is tangential to the drum filter surface. Reference line 128 represents the maximum angle of 45 degrees. Thus, the liquid jets may be applied at an angle A which can be in the range from about 0 degrees to about 45 degrees, as illustrated by liquid jet 150a, of vertical plane 127. The angle A is measured from plane 127 in a direction that is opposite the direction of rotation of drum 12. In a preferred embodiment, the liquid jets are applied at an angle within the range from about 0 degrees to about 30 degrees of plane 127. Applying the liquid jets within this range reduces splashing of the liquid and the lime material, and minimizes the "sand blasting" effect, which is created when high pressure sprays drive the abrasive lime sludge against the filter cloth and the metal drum surface. Positioning of the reciprocating mechanism 26 on the ascending side 12a of the drum filter also facilitates maintenance and inspection of apparatus 10.

Figure 7:
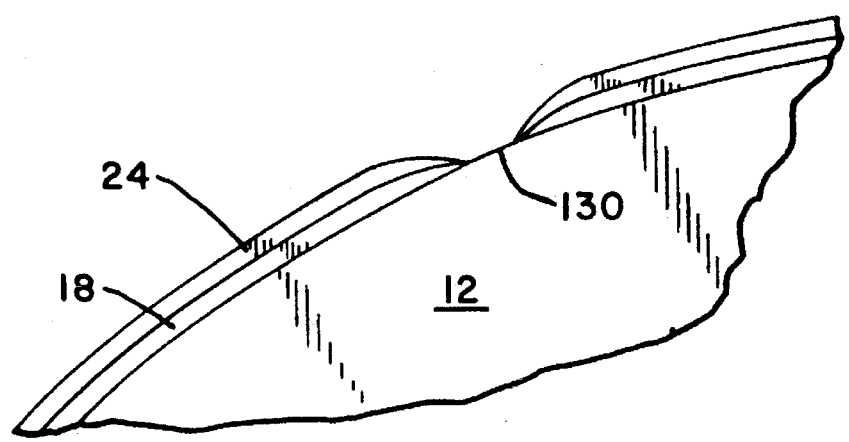
FIG. 7 is a partial, enlarged view of a strip formed in the sludge layers on the drum filter surface after application of the liquid jet shown in FIG. 3.

Referring to FIGS. 3 and 7, the spray emanating from nozzles 99 and 101 is shaped as a "fan". The fan spray allows a narrower strip of precoat 18 and second layer 24 to be dispersed from filter cloth 18. The letter C designates the 15 degree to 30 degree range of the fan spray. A fan spray having an angle within this range will result in a dispersed strip 130 of precoat and outer second 24 layer having a width of about 0.5 inches to about 0.75 inches. It has been found that a strip having a width within the aforementioned range minimizes vacuum loss within the corresponding interior cell of drum 12. Reciprocating mechanism 26 is oriented in a manner such that the distance between each nozzle 99, 101 and the drum surface is from about 3.5 inches to about 7 inches. The liquid jets emanating from nozzles 99 and 101 are pressurized within the range from about 400 p.s.i. (pounds per square inch) to about 1,500 p.s.i. In a preferred embodiment, the pressure of the liquid jets is about 750 p.s.i. and the liquid consists of filtered water. Under normal operating conditions, reciprocating mechanism 26 consumes about three (3) gallons per minute.

Shower heads 124 are mounted past reciprocating mechanism 26 in the direction of rotation of drum 12. Shower heads 124 may be placed at an angle within the range of B degrees which is defined by plane 128 and vertical plane 126. Plane 126 passes through the horizontal rotational axis of drum 12. In a preferred embodiment, shower heads 124 are positioned adjacent mechanism 26. Shower heads 124 emit liquid, which is typically water, to the area defined by the dispersed or cleaned-strip 130 of precoat 18 and outer layer 24 so that the liquid and the lime material comprising the surrounding precoat and outer layers form a cake wash water which fills in strip 130 to form a new single layer of lime sludge which has a high concentration of liquid therein. Referring to FIG. 6, scraper 22 scrapes the dried portions of the second or outer layer 24, located on either side of the strip, from the drum filter. The lime sludge which is scraped has a dried-solids content of about 70% to about 85% and a thickness from about 0.25 inch to about 0.5 inch. The lime sludge scraped from the drum surface is dropped onto a belt conveyor (not shown). The scraping tip of the scraper 22 is kept at a predetermined distance from the surface of drum 12 so as to maintain a predetermined precoat thickness. The precoat thickness formed by the present invention and method is in the range of about 3/8 of an inch to about 5/8 of an inch.

The method and apparatus of the present invention provides numerous advantages over conventional apparatuses and methods for thickening lime sludge. For instance, since the dispersed strip 130 has a width that is significantly less than the strip produced in conventional systems, and the strip is immediately refilled by the cake wash water, loss of vacuum in the corresponding cell of the hollow interior of the drum is minimized. Thus, the present invention avoids the necessity of utilizing valving network which terminates the vacuum to the cell of the drum interior that corresponds to the strip. Conventional systems, which remove the filter cake on the descending side of the drum filter, typically utilize more water and at a higher pressure because the filter cake on the descending side of the drum filter is thinner due to the liquid extraction of the vacuum, and the compactness of the filter cake as a result of the contact with the underside of the scraper. The present invention provides dispersing a strip of the filter cake, which comprises the precoat and the fresh second or outer layer picked up in the vat, on the ascending side of the drum where the filter cake is thickest and has a liquid content from about 60% to about 70%. Thus, the present invention overcomes the difficulties and problems associated with removing the precoat from the descending side of the drum which is under the scraper.

Another advantage of the present invention is the utilization of a reciprocating mechanism 26 that utilizes two (2) nozzles wherein each nozzle is reciprocated only half the longitudinal distance of drum 12. The decreased travel distance for each nozzle decreases the wear on the mechanical components which produce the reciprocating motion and decreases the chance of the flexible hoses becoming entangled with the vat agitator arm, vat hood, wash water pipes 64, 66 or other components. Furthermore, the flexible water hoses 56, 58 are the only components traveling with nozzle carriages 28, 30, respectively. No electrical wires or other components travel with the nozzle carriages 28, 30.

As previously described above, switches 80, 82 and solenoid 72 and valve 68 may be configured such that water is alternately dispensed from nozzles 99, 101. However, these components can easily be adapted to provide simultaneous dispensing of water from nozzles 99, 101. If a configuration is used which provides for only one nozzle to dispense water at a time, the spring system flow rate will be decreased thereby allowing utilization of a smaller high pressure pump. Thus, efficiency of the system is improved since less water is being required to produce the aforementioned strip in the precoat and outer layers.

The range in which the nozzles may be placed from the drum surface, about 3.5 inches to 7 inches, provides considerable flexibility in the placement of reciprocating mechanism 26 on existing filters. Positioning the nozzles at a distance within the aforementioned range reduces the actual impact force on the drum surface which decreases the aforementioned sand blasting effect. The rigidity and strength of nozzle carriage support 32 and the associated components reduces the deflection of nozzles 99, 101 from the force of the high pressure spray. Furthermore, since the fan spray is vertical to the drum surface, strips may be produced having a width between the range of about 0.5 inch to about 0.75 inch, as opposed to the strips produced by conventional apparatuses which are typically up to 2 inches wide.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A rotary drum filter assembly comprising:

a filter drum having a peripheral filter surface covered with a filter medium and a hollow interior, said drum being mounted on a shaft for rotation about a substantially horizontal axis, said drum ascending on one side of said axis in a direction of rotation and said drum descending on the other side of said axis in the direction of rotation;

a nozzle positioned on said ascending side of said drum for directing a liquid jet toward said peripheral filter surface at an angle between about 0 degrees and 45 degrees of a vertical plane tangential to said peripheral filter surface, the angle being measured from the vertical plane in a direction opposite the direction of rotation, said liquid jet being directed against a precoat layer and an outer layer of sludge on said peripheral filter surface so as to disperse a strip of the layers in a manner such that substantially all of the sludge which comprises the strip of the layers remains on the drum;

a shower head positioned past said nozzle in the direction of rotation of said drum; and a scraper positioned on the descending side of said drum for scraping accumulated sludge from said peripheral filter surface.

2. The assembly of claim 1 wherein said shower head is positioned within an angular range, with respect to said drum peripheral surface, defined by a position immediately after said nozzle and a vertical plane through said horizontal rotational axis of said drum, said shower head directing liquid to an area defined by said strip so that the liquid and sludge material comprising the precoat and outer layers surrounding said strip form a cake wash water which fills in said strip to form a new single layer of sludge.

3. The assembly of claim 1 wherein the liquid jet emanates from said nozzle in the shape of a fan having an angle between about 15° and 30°.

4. The assembly of claim 3 wherein the liquid jet has a pressure from about 400 p.s.i. to about 1000 p.s.i.

5. The assembly of claim 4 wherein the distance between said nozzle and the drum surface is between about 3.5 inches and 7 inches.

6. The assembly of claim 1 wherein said nozzle comprises a pair of nozzles.

7. The assembly of claim 6 further including a nozzle reciprocator for reciprocating each nozzle in a dimension substantially parallel to the axis of rotation of said drum, each nozzle traveling about half the longitudinal length of said drum.

8. The assembly of claim 7 wherein said nozzle reciprocator includes means for allowing only one of said nozzles at a time to emit a liquid jet.

9. The assembly of claim 7 wherein said nozzle reciprocator includes means for allowing said nozzles to emit liquid jets simultaneously.

10. The assembly of claim 1 wherein the filter medium comprises a filter cloth, and said hollow drum interior is connected to a source of vacuum.

* * * * *